United States Patent [19]

Shoults

[11] 3,715,399
[45] Feb. 6, 1973

[54] 2,2,4,4-TETRAKIS(DIFLUOROAMINO)-PENTANE PROCESS

[75] Inventor: Royland D. Shoults, Arab, Ala.

[73] Assignee: The United States of America as represented by the Secretary of the Army

[22] Filed: Nov. 12, 1968

[21] Appl. No.: 775,999

[52] U.S. Cl. ........................... 260/583 NH, 149/109
[51] Int. Cl. .............................................. C07c 85/04
[58] Field of Search ............................. 260/583 NH

[56] References Cited

UNITED STATES PATENTS 3,423,463  1/1969  Baum .................................. 260/583
3,436,419  4/1969  Rhodes ............................... 260/583

Primary Examiner—Leland A. Sebastian
Attorney—Harry M. Saragovitz, Edward J. Kelly, Herbert Berl and James T. Deaton

[57] ABSTRACT

2,2,4,4-Tetrakis(difluoramino)pentane and a process for its preparation. This novel composition of matter is a high energy compound for sue as a plasticizer and/or oxidizer in propellant compositions. A practical process of synthesis of this compound has been developed. This process involves the interaction of 2,4-pentanedione and difluoroamine in the presence of 30 percent fuming sulfuric acid. This process is applicable to other 1,3-dicarbonyl compounds, monocarbonyl compounds in general, diacetates, acetals and enol phosphates.

2 Claims, No Drawings

2,2,4,4-TETRAKIS(DIFLUOROAMINO)PENTANE PROCESS

BACKGROUND OF THE INVENTION

This invention relates to a novel high energy compound for use in propellant compositions and a process of synthesis thereof. The desirability of high energy propellant compositions for rocket and ordance projections is well-established. If desired, a high energy metal additive may be used in the propellant composition. However, it is frequently desirable to achieve a high energy propellant composition by other means.

Accordingly, it is an object of this invention to provide new high energy compounds for use in propellant compositions.

It is a particular object of this invention to provide new high energy compounds containing the functional groups, $NF_2$, for use in propellants.

It is a related object of this invention to provide such compounds which are easily manufactured using conventional apparatus.

SUMMARY OF THE INVENTION

It has been discovered that 2,2,4,4-tetrakis(difluoroamino)pentane may be used as a novel high energy compound in propellant compositions. A practical process of synthesis thereof has been developed. This process involves the interaction of 2,4-pentanedione and difluoroamine in the presence of 30 percent fuming sulfuric acid. It is carried out at ambient temperature and pressure by the addition of the acid catalyst to the di-beta-ketone which is saturated with difluoroamine. This process is applicable to similar compounds such as other 1,3-dicarbonyl compounds, monocarbonyl compounds in general, diacetates, acetals and enol phosphates.

DESCRIPTION OF THE PREFERRED EMBODIMENT

These and other objects and advantages of this invention will become more readily apparent as the following detailed description proceeds.

It has been discovered that 2,2,4,4-tetrakis(difluoroamino)pentane may advantageously be used as a novel high energy compound in propellant compositions. This novel compound may be prepared according to the following process:

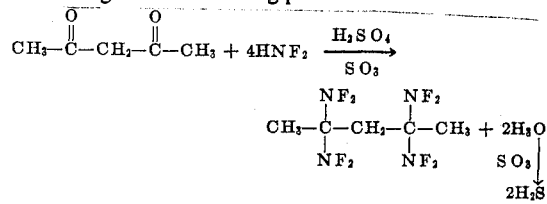

The process is carried out at ambient temperature and pressure by the addition of the acid catalyst to 2,4-pentanedione which is saturated with difluoramine. This process is also applicable to other 1,3-dicarbonyl compounds, monocarbonyl compounds in general, diacetates, acetals and enol phosphates.

To fully illustrate this invention, the following example is presented. It is to be understood, however, that this example is presented merely as a means of illustration and is not intended to limit the scope of this invention in any way.

Reagents 1. 40.0 grams (0.4 moles) of 2,4-pentanedione.
2. 213.6 g. of 30 percent fuming sulfuric acid (0.8 moles of $SO_3$).
3. 962 ml. of 1.98 molar difluorourea (1.9 moles).
4. 300 ml. of 2 molar sulfuric acid.

Apparatus

The apparatus is designed to be operated remotely and consists of four units: $HNF_2$ generator, reactor, washing assembly, and distillation assembly. The apparatus is set up in such a manner as to allow general type atmospheric pressure reactions of $HNF_2$ to be carried out.

The generator consists of a three-liter, three-neck flask equipped with a two-liter dropping funnel (constructed of polyethylene), nitrogen inlet tube (the nitrogen flow rate is controlled by means of a Mathieson 622PBV flow meter), chilled water condenser, heating mantle, magnetic stirrer, salt-ice trap (connected to the condenser), and a drying tower, filled with a suitable drying agent, such as the special anhydrous calcium sulfate, highly porous granular material, Drierite (a product available from W. A. Hammond Drierite Co., Xenia, Ohio). The reactor, connected to the drying tower, is equipped with a thermistor probe (for temperature indication), pressure equalized dropping funnel, magnetic stirrer, Friedrichs condenser (for circulating methylene, $-70°$ C.), and an inlet tube for the admission of methylene chloride solvent. Another condenser (chilled-water) is connected to the $-70°C$. condenser for refluxing the solvent in the $HNF_2$ elimination step. The reactor is equipped with a combination water bath for heating (heating coil connected to a powerstat) and cooling (chilled-water inlet). A glass tube extends from the bottom of the reactor for the purpose of purging the reaction mixture with nitrogen. The tube is also connected to a polyethylene line for transferring the reaction product to the washing assembly.

The washing assembly consists of a one-liter flask equipped with a mechanical stirrer, water aspirator vacuum line, inlets for water and aqueous sodium bicarbonate, and a drainage tube (with a three-way stopcock) leading to a 1-liter separatory funnel. A fritted glass filtering funnel is used to dry and filter the product solution. The distillation apparatus consists of a small three-neck flask equipped with a magnetic stirrer, thermometer, heating mantle, 8-inch vacuum-jacketed glass helices-packed column, condenser, and fraction-cutting receiver.

All of the apparatus, including the connections, is constructed of glass, polyethylene, or the product polytetrafluoroethylene (commonly sold under the trademark Teflon).

Procedure

The generator and reactor are flushed thoroughly with nitrogen, the generator is charged with 300 ml. of 2 molar sulfuric acid, the 926 ml. of difluorourea (DFU) (cold) is added to the polyethylene dropping funnel, the 40 g. of 2,4-pentanedione is added to the reactor, the reactor dropping funnel is charged with 213.6 g. of 30 percent fuming sulfuric acid, circulation of methylene chloride (−70°C.) through the Friedrichs condenser, by means of a pump, is begun and the nitrogen rate is adjusted to about 35–40 cc./min. to the generator and 20–25 cc./min. to the reactor.

The acid in the generator is heated to reflux and the addition of DFU is begun. The effluent gases ($CO_2$, $HNF_2$), which are produced shortly are carried into the reactor where the $HNF_2$ condenses. On initial contact of the $HNF_2$ with the substrate there is a slight exotherm (bath temperature, 18°C., reactor temperature, 20°C.) which subsides shortly. After about 200 ml. of the DFU is added, the dropwise addition of the acid catalyst is begun (exothermed to 23°C.). The DFU and acid catalyst are added concurrently over about a 45 minute period at the end of which time the reaction temperature is about 20°C. The bath temperature is raised from about 30° to 40°C. and the reaction is allowed to continue for an additional 45 minutes at a temperature of 20°–35°C. The bath temperature is raised to about 60°C. and the reaction is continued for an additional 1 hour and 25 minutes at 35°–40°C. At the end of this time about 150 ml. of solvent is added to the reactor, the coolant flow in the −70°C. condenser is turned off, the coolant flow to the chilled water condenser connected to the reactor is turned on, the nitrogen flow to the reactor is increased, and the methylene chloride solvent is refluxed for ten-fifteen minutes during which time the excess $HNF_2$ is eliminated.

The reaction mixture is cooled to about 20°C. and then is transferred to the washing assembly. The reactor and transfer line are rinsed with several small portions of methylene chloride. After the transfer is completed the reaction mixture is stirred thoroughly and allowed to stand for a few minutes. The lower (acid) layer is separated and discarded and the methylene chloride layer is washed with water, aqueous sodium bicarbonate, and again with water. The solution is filtered through a fritted glass funnel, containing anhydrous magnesium sulfate, into the distillation flask. The solvent is removed by distillation at atmospheric pressure and finally the product is distilled at reduced pressure to yield essentially pure 2,2,4,4-tetrakis(difluoramino)-pentane (25 g., 23 percent of theory).

Physical Properties

| | |
|---|---|
| Boiling Point: | 47°C./4.5 mm. |
| Index of Refraction ($n_D^{20}$) | 1.3785 |
| Density ($d_4^{29}$): | 1.543 |
| Purity (vapor phase chromatography) Anal.: | 99.9% |

| | |
|---|---|
| Calc'd. for $C_5H_8N_4F_8$: | C, 21.75; H, 2.92; N, 20.29; F, 55.04 |
| Found : | C, 21.6; H, 3.14 N, 21.3; F, 55.8 |
| Impact sensitivity (Picatinny): | 2.8 Kg., in., 100% fire level. |

The infrared spectrum exhibited strong absorption bands at 9.9 and 11 microns ($NF_2$). The $F^{19}$ n.m.r. (nuclear magnetic resonance) spectrum contained a singlet centered at −4274 cps from trifluoroacetic acid while the proton n.m.r. spectrum exhibited a pentuplet ($CH_3-C(NF_2)_2-$) centered at 1.75 PPM (parts per million) and a singlet ($-CH_2-$) at 2.9 PPM.

2,4-pentanedione is the first 1,3-diketone (1,3-dicarbonyl compound) that has been successfully converted to a 1,3-dicarbonyl difluoroamino derivative. This reaction is particularly difficult to accomplish. Acid-catalyzed condensations of $HNF_2$ and carbonyl compounds or their derivatives are equilibrium controlled processes and are thus subject to great variations in rate due to apparently slight changes in reaction conditions. Thus, acid strength, pressure, temperature and the relative concentrations of difluoroamine and substrate must be considered.

30 percent fuming sulfuric acid is preferred. However, other strong fuming sulfuric acid concentrations may be successfully employed, in some instances by varying the other reaction conditions such as temperature and pressure.

The general process is applicable to all 1,3-dicarbonyl compounds (or derivatives thereof). In a broader sense, it is applicable to monocarbonyl compounds in general. It is also applicable to diacetates, acetals, and enol phosphates in general.

The product of the reaction is the fully saturated difluoroamine of the particular starting compound.

I claim:
1. The process of preparing 2,2,4,4-tetrakis-(difluoramino) pentane comprising:
   saturating 2,4-pentanedione with at least a theoretical amount of difluoramine;
   reacting said 2,4-pentanedione that is saturated with at least a theoretical amount of difluoramine at ambient temperature and pressure in the presence of a strong fuming sulfuric acid that is added dropwise to said 2,4-pentanedione to catalyze the reaction to form 2,2,4,4-tetrakis-(difluoramino)pentane; and recovering said 2,2,4,4-tetrakis(difluoramine) pentane.
2. The process of claim 1 wherein said process includes a concurrent addition of said strong fuming sulfuric acid and difluoramine to said 2,4-pentanedione that is saturated with at least a theoretical amount of difluoramine.

* * * * *